United States Patent Office 3,207,725
Patented Sept. 21, 1965

3,207,725
DYEABLE POLYOLEFIN COMPOSITIONS CONTAINING DIPHENYL ETHER SULFONATES
Charles R. Pfeifer, Newport News, Va., assignor to The Dow Chemical Company, Midland, Mich., a corporation of Delaware
No Drawing. Filed July 31, 1962, Ser. No. 213,583
7 Claims. (Cl. 260—45.7)

This invention relates to polymeric compositions that are dyeable with conventional dyeing techniques. It particularly relates to dyeable polyolefin compositions that are adapted to be dyed with basic dyes.

It is well known that polyolefins, of both the aromatic and non-aromatic varieties are difficultly dyed. Particular difficulty in this regard has been encountered when attempts are made to dye the polyolefin compositions with basic dyes. Experience has shown that polyolefins have little or no receptivity for basic dyestuffs when normal dyeing procedures in an aqueous dyebath are employed. For example, when attempts are made to dye filaments or other shaped articles of polypropylene and the like with a basic dye in water at or near 100° C., the polypropylene filaments are recovered from the bath either completely uncolored or, at best, perhaps lightly stained on the surface.

Several methods have been proposed to alleviate the aforementioned dyeing problems, especially with respect to polypropylene. Thus, one means has been to graft, in some manner, a dyeable polymer onto the polypropylene base or other substrate polymer (U.S. 2,837,496; Belgian Patents 558,004, 564,910). Another method involves the use of oil soluble dyestuffs on the unmodified polymer (Belgian Patents 558,813, 562,893, 566,695). Still other proposed methods employ direct coloring, as by pigments or certain dyestuffs, of the polyolefin melt before fabricating the molten polymer into shapes (Belgian Patent 562,392). Yet another method is to manufacture the dye in the polyolefin (Belgian Patent 562,893). A still further method involves blending with the polyolefin a polymer that is more dyeable tahn the polyolefin (Belgian Patents 561,156, 563,123).

It is obvious to one skilled in the art that each of the above methods have one or more advantages and disadvantages when contrasted to one another. For instance, color matching and uniform mixing from one batch to another requires close and tedious control; contamination of the spinning equipment with color bodies or other foreign bodies requires clean-out labor and periods of inoperability; and, the properties of the polyolefin product may be significantly downgraded due to the particular additive added.

Accordingly, it is the chief object and primary concern of the present invention to provide dyeable polyolefin compositions that are dyeable to through-colored and deep shapes of coloration.

It is another object to provide dyeable polyolefin compositions that are exceptionally heat stable.

It is still another object to provide dyeable polyolefin compositions that are readily and efficiently produced.

It is yet another object to provide dyeable polyolefin compositions in which the component principally responsible for the excellent dyeability is highly compatible with the polyolefin and resists bleeding out of the composition during fabrication and subsequent processing treatments.

It is yet a further object to provide shaped articles of the dyeable polyolefin compositions of the invention.

These as well as additional objects and advantages are achieved by employing the compositions of the instant invention which comprise, in intimate blended relationship, from about 0.5 to about 10 weight percent, based on the weight of the composition, of an alkyl diphenyl ether sulfonate with between about 99.5 and about 90 weight percent of an olefin polymer having in the polymer molecule a major proportion of a polymerized olefin monomer selected from the group consisting of alkylene aromatic monomers and non-aromatic olefin monomers.

The alkyl diphenyl ether sulfonates that are employed in the practice of the present invention are all soluble in water and in aqueous solutions of acids, bases or salts. More specifically, those alkyl diphenyl ether sulfonates are utilized which are described by the formula:

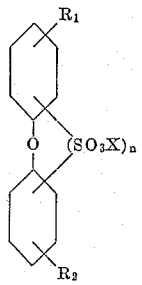

wherein
$R_1$ is an alkyl radical containing 9 to 15 carbon atoms,
$R_2$ is selected from the group consisting of hydrogen, a halide, and an alkyl group containing 9 to 15 carbon atoms,
X is selected from the group consisting of alkali metals, ammonium and hydrogen, and
$n$ has a value from 1 to 2.

A method of preparing the alkyl diphenyl ether sulfonates intended for use in the present compositions is disclosed in U.S. Patent No. 2,854,477. Thus, typical of the sulfonates that may be used with benefit are: monododecyl diphenyl ether sodium sulfonate (alternatively referred to as dodecylidiphenyl oxide sulfonic acid, sodium salt); didodecyl diphenyl ether sodium sulfonate; monododecyl diphenyl ether disodium sulfonate; didodecyl diphenyl ether disodium sulfonate; mono- and dinonyl diphenyl ether mono- and di-sodium sulfonates; mono- and di-pentadecyl mono- and disodium sulfonates; or, as a more specific embodiment with different nomenclature, disodium - 2,2' - oxybis (4-dodecylbenzenesulfonate).

Other typical sulfonates are readily obvious by substituting other alkali metals or ammonium for sodium in the aforementioned compounds as well as substituting a halide, e.g., chlorine in the $R_2$ position in the structural formula. The hydrogen form (which may also be employed) is, of course, a sulfonic acid. In this connection, in the case of the disulfonates, it is apparent that one of the sulfonate groups may be in the form of the acid and the other in the form of one of the herein described salts. In the preferred embodiment of the invention, the salt forms of the sulfonates are used.

It is readily apparent to those skilled in the art of preparation of the sulfonates by the above-described patented method of sulfonation of an alkyl diphenyl ether that, most frequently, a mixture of several sulfonates results. Also, the exact position or positions of substitution of the sulfonate group on the diphenyl ether nucleus is variant and frequently indeterminable. The exact position of the sulfonate group on the nucleus is immaterial for purposes of the present invention. It is to be understood that a mixture of two or more of the alkyl diphenyl ether sulfonates, as well as a single species, may be employed with advantage in the practice of the present invention.

Styrene or vinyl toluene may advantageously be utilized as the alkylene aromatic monomer for forming the olefin polymer of the present invention although, if desired, such monomeric substances as ortho- and para-methyl styrene, ortho-, meta-, and para-ethyl styrene, para-isopropyl styrene, monochloro styrene, the several dichloro styrenes, vinyl napthalene, alpha-methyl styrene, and the like or mixtures thereof may be employed. Advantageously, the olefin polymers of alkylene aromatic monomers utilized in the practice of the present invention are those derived from monomers of the structural formula:

$$CH_2=CGAr$$

in which G is selected from the group consisting of hydrogen and methyl and Ar is an aromatic radical of from 6 to about 10 carbon atoms (including the carbon atoms in alkyl substituents).

In a preferred embodiment of the invention, non-aromatic hydrocarbon polyolefins that are prepared by polymerization of mono-olefinic aliphatic olefin monomers are employed in the polymer compositions of the invention. Principally, olefin polymers of those mono-olefin aliphatic olefin monomers (including polymerizable mixtures thereof) that contain from 2 to about 8 carbon atoms, such as ethylene, propylene, butylene, 3-methyl-1-butene, 4-methyl-1-pentene and so forth, mixtures of ethylene and propylene, and the like, are utilized. Beneficially and advantageously, propylene is used.

The polypropylene or other non-aromatic hydrocarbon polyolefin which is preferably employed in the practice of the present invention, as mentioned, may be polymers of any normally solid and film-forming nature. For example, the polymers of ethylene which are employed may be those, or similar to those, which sometimes are referred to as "polythenes" and which may be obtained by polymerizing ethylene in a basic aqueous medium and in the presence of polymerization-favoring quantities of oxygen under relatively high pressures in excess of 500 or 1,000 atmospheres at temperatures which may be between 150° and 275° C. or, if desired, the ethylene and propylene and other non-aromatic hydrocarbon olefin polymers may be essentially linear polymers, or polyolefin products similar to those materials. The essentially linear, macromolecular, high density polyethylenes have been referred to as "ultrathenes." They ordinarily have greater apparent molecular weights (as may be determined from such characteristics as their melt viscosities and the like) than the "polythene" type polyethylenes which are usually in excess of at least about 20,000 and generally in excess of about 40,000; densities of about 0.94–0.96 gram per cubic centimeter; and melting points in the neighborhood of 125–135° C. They are also ordinarily found to have a more crystalline nature than conventional polyethylenes and may contain less than 3.0 and and even less than 0.3 methyl radical per 100 methylene groups in the polymer molecule. The essentially linear and unbranched polymers of ethylene and propylene and other non-aromatic hydrocarbon olefins may be obtained under relatively low pressures of 1 to 100 atmospheres using such catalysts for polymerizing the ethylene or propylene or other olefin as mixtures of strong reducing agents and compounds of Group IV–B, V–B and VI–B metals of the Periodic System; chromium oxide on silicated alumina; hexavalent molybdenum compounds; and charcoal supported nickel-cobalt.

If desired, other ethylenically unsaturated monomers may be copolymerized with the olefin monomers and utilized for the olefin polymers of the present compositions. Illustrative of these other ethylenically unsaturated monomers are the acrylate and methacrylate esters including methyl, ethyl, propyl, butyl etc. acrylate and methacrylate; vinyl acetate; vinyl chloride; vinylidene chloride; acrylonitrile and the like.

When ethylenically unsaturated monomers other than the herein indicated olefin monomers are employed with the olefin monomers for preparation of the olefin polymers, at least a major proportion (i.e., 50 weight percent) of the polymer molecule should be comprised of polymerized olefin monomer units. Advantageously, the polymer molecule should contain at least about 80 and preferably 90 weight percent of polymerized olefin monomer units.

As indicated, the polyolefin compositions of the invention have incorporated therein between about 0.5 and about 10 weight percent, based on the weight of the composition, of the alkyl diphenyl ether sulfonate. Preferably, between about 2 and about 4 weight percent of the alkyl diphenyl ether sulfonate is employed. Generally, when concentrations much less than about 0.5 weight percent are used the desirable dyeability enhancements are not obtained. On the other hand, when concentrations much in excess of about 10 weight percent are employed the physical properties of articles fabricated from the compositions may be adversely affected.

In the preparation of the present compositions, although other known methods may be employed, it is preferable to dry blend the olefin polymer in powder or pulverulent form with the alkyl diphenyl ether sulfonate which is a solid at normal conditions.

The incorporation of the alkyl diphenyl ether sulfonate in the polymeric olefin composition provides compositions that are readily and efficiently dyed. The products fabricated therefrom can be excellently dyed to deep shades of coloration which penetrates throughout the article. The composition is particularly well suited to be dyed with basic dyes, which dyes are known for their brilliant, vivid shades.

The alkyl diphenyl ether sulfonates are especially well suited for use in the present compositions because of their manifold beneficial functionality when employed according to the invention. For instance, many of the problems encountered when additives are incorporated in polyolefins is that compatibility is low and the additives will be poorly distributed throughout the composition and/or bleed out or be otherwise unwantedly removed from the composition, frequently during fabrication or subsequent treatments. Another problem often encountered is that the additive adversely affects the physical properties of the product containing it. Or, the additive may cause discoloration of the product during heat fabrication. In the present case, the alkyl diphenyl ether sulfonates are, to an unusual degree, highly compatible with the olefin polymers and remain uniformly incorporated therein during heat fabrication and further treating, including scouring and the like. Shaped articles of the composition have, for all practical purposes the same physical properties as the base polymer, save, of course, dyeability. Additionally, the alkyl diphenyl ether sulfonates do not discolor or decompose during heat fabrication of the present compositions.

A particular embodiment of the invention concerns the preparation of dyeable polypropylene compositions. In this regard, it is of particular concern to prepare dyeable textile filaments of polypropylene. The reasons for this can be appreciated since it is textile applications that are so demanding on dyeability properties.

The following examples will further illustrate the invention wherein, unless otherwise specified, all parts and percentages are by weight.

*Example 1*

Ten pounds of polypropylene having a melting point of 155–170° C.; melt index of 1.35 (determined with 2.16 kg. load at 190° C., ASTM method); tenacity, 5.1 grams/denier; and elongation 25.5 percent were dry blended in powder form with 0.2 pound of dodecyl diphenyl ether disodiumsulfonate. The blended material was then melt-extruded to effect a more uniform mixture of the blended constituents. The resulting extrudate was cut into pellets which were then melted and spun at 300° C. into continuous filaments. The filaments were readily stretched at 110° C. to give 4-denier filaments having a tenacity of about 5 grams/denier and an elongation of 26–29 percent.

The filaments were readily and efficiently dyed with such basic dyestuffs as:

| Dyestuff: | Color index |
|---|---|
| Brilliant Green B | Basic Green 1. |
| Sevron Green B | Basic Green 3. |
| Sevron Brilliant Red 4G | Basic Green 14. |
| Genacryl Yellow 3G | Basic Green 11. |
| Sevron Brilliant Red B | None. |
| Genacryl Yellow 4G | None. |
| Victoria Blue B | Basic Blue 26. |
| Sevron Blue BGL | None. |

The filaments were dyed, for example, by immersing 0.5 gram of the filaments in a hot solution made up of 450 ml. of water, 0.375 ml. acetic acid, and 0.015 g. of Brilliant Green B dyestuff crystals. The temperature of the dyebath was maintained at 95–100° C. for about 15 minutes. After this time, the filaments were rinsed thoroughly with water and observed to be a deep, bright shade of green.

The filaments retained their deep green coloration even after prolonged washing in boiling water or in boiling water containing any of several common household detergents. The dyed filaments also exhibited good light stability after exposure to the illumination of a carbon arc for a period of 20 hours.

In contrast, when polypropylene filaments were prepared according to the foregoing procedure with the exception that none of the dodecyl diphenyl ether disodium-sulfonate was blended with the polypropylene, and the filaments were dyed with the basic dyestuffs, the filaments remained uncolored or only lightly stained.

*Example 2*

Filaments prepared according to Example 1 were also dyed with disperse dyestuffs, e.g., Eastman Blue BNN (C.I. Disperse Blue 3), to good shades of coloration, although washfastness was less satisfactory than with the basic dyes.

*Example 3*

A portion of the filaments from Example 1 containing the sulfonate was heat-set for 20 seconds at 140° C. before dyeing. The excellent results with the basic dyestuffs were unaffected, but the filaments were less receptive to the disperse dyestuffs.

Similar excellent results to the foregoing are obtained when other of the olefin polymers and other of the alkyl diphenyl ether sulfonates are employed in accordance with the invention.

What is claimed is:
1. A dyeable polyolefin composition comprising from about 0.5 to about 10 weight percent, based on composition weight, of an alkyl diphenyl ether sulfonate represented by the structural formula:

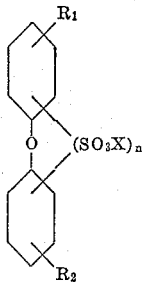

wherein $R_1$ is an alkyl radical containing 9 to 15 carbon atoms; $R_2$ is selected from the group consisting of hydrogen, a halide and an alkyl group containing 9 to 15 carbon atoms; X is selected from the group consisting of an alkali metal, ammonium and hydrogen; and $n$ has a numerical value from 1 to 2; and between about 99.5 and about 90 weight percent, based on composition weight, of a polymerized ethylenically unsaturated monomeric material containing at least about 50 weight percent of a polymerized hydrocarbon olefin monomer containing from 2 to about 13 carbon atoms.

2. The composition of claim 1 containing at least about 90 weight percent of said polymerized olefin monomer.

3. The composition of claim 1, wherein said polymerized ethylenically unsaturated monomeric material is polypropylene.

4. The composition of claim 1, containing between about 2 and about 4 weight percent, based on composition weight of said alkyl diphenyl ether sulfonate.

5. The composition of claim 1, wherein said alkyl diphenyl ether sulfonate is dodecyl diphenyl ether disodium-sulfonate.

6. A filamentary shaped article of the composition set forth in claim 1.

7. A filamentary shaped article of the composition of claim 3.

References Cited by the Examiner

UNITED STATES PATENTS

| 2,854,477 | 9/58 | Steinhauer | 260—512 |
| 3,108,090 | 10/63 | Leandri et al. | 260—45.7 |

LEON J. BERCOVITZ, *Primary Examiner.*

DONALD E. CZAJA, *Examiner.*